United States Patent
Grasso et al.

(10) Patent No.: US 6,255,792 B1
(45) Date of Patent: Jul. 3, 2001

(54) INTELLIGENT SUCTION DEVICE CAPABLE OF AUTOMATICALLY ADAPTING THE SUCTION FORCE ACCORDING TO THE CONDITIONS OF THE SURFACE, PARTICULARLY FOR VACUUM CLEANERS AND THE LIKE

(75) Inventors: Giuseppe Grasso, Messina; Matteo Lo Presti, Misterbianco; Gianfranco Sortino, Catania, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/514,972

(22) Filed: Feb. 29, 2000

Related U.S. Application Data

(62) Division of application No. 09/236,786, filed on Jan. 25, 1999, now Pat. No. 6,105,202.

(30) Foreign Application Priority Data

Jan. 30, 1998 (EP) .................................................. 98830041

(51) Int. Cl.[7] .............................. G06F 17/00; A47L 9/28; B64C 17/02
(52) U.S. Cl. ................... 318/508.1; 318/508.12; 395/61; 15/319; 15/339
(58) Field of Search ..................... 318/479–499, 318/560–696; 98/1.5, 2.01, 2.11; 15/412, 319, 339; 395/900, 61, 3

(56) References Cited

U.S. PATENT DOCUMENTS

| 4,581,988 | * | 4/1986 | Mattei ............................... 98/1.5 |
| 5,243,732 | * | 9/1993 | Koharagi et al. ................. 15/319 |
| 5,255,409 |   | 10/1993 | Fujiwara et al. ................ 15/319 |
| 5,722,109 | * | 3/1998 | Delmas et al. .................... 15/319 |
| 5,748,853 | * | 5/1998 | Deschenes ......................... 395/61 |

FOREIGN PATENT DOCUMENTS

| 43 04 263 C1 | 4/1994 | (DE) . |
| 0 451 787 A1 | 4/1991 | (EP) . |
| 0 479 609 A2 | 10/1991 | (EP) . |
| 0 488 883 A2 | 11/1991 | (EP) . |
| 0 488 884 A1 | 11/1991 | (EP) . |
| 0 527 567 A2 | 7/1992 | (EP) . |
| 4-75622 | 3/1992 | (JP) . |
| 4-122340 | 4/1992 | (JP) . |
| 4-309319 | 10/1992 | (JP) . |

* cited by examiner

Primary Examiner—Paul Ip
(74) Attorney, Agent, or Firm—Theodore E. Galanthay; Allen, Dyer, Doppelt, Milbrath & Gilchrist, P.A.

(57) ABSTRACT

An intelligent suction device, particularly for vacuum cleaners and the like, includes a fuzzy-logic controller for controlling the motor of a fan or turbine. The suction pressure is detected by at least one pressure sensor which feeds back its measurement, in a closed loop, to the controller.

10 Claims, 3 Drawing Sheets ature of the present invention relates to an intelligent suction device capable of automatically adapting the suction force according to the conditions of the surface, particularly for vacuum cleaners and the like

INTELLIGENT SUCTION DEVICE CAPABLE OF AUTOMATICALLY ADAPTING THE SUCTION FORCE ACCORDING TO THE CONDITIONS OF THE SURFACE, PARTICULARLY FOR VACUUM CLEANERS AND THE LIKE

This application is a division of Ser. No. 09/236,786 filed on Jan. 25, 1999, now Pat. No. 6,105,202 the disclosures of which are hereby incorporated by reference in their entirety.

FIELD OF THE INVENTION

The present invention relates to an intelligent suction device capable of automatically adapting the suction force, such as, for vacuum cleaners and the like.

BACKGROUND OF THE INVENTION

It is known that in a vacuum cleaner the suction force is usually adjusted manually by the user according to the surface that the user intends to clean. This system generally has a potentiometer which allows varying the speed of the motor of the fan of the vacuum cleaner. In these systems, the user must therefore manually vary the working setting of the vacuum cleaner according to the type of surface to be cleaned.

Usually, the user uses the maximum speed of the fan needlessly. In these conditions, besides having a high noise level, the energy consumption is higher than necessary and there is no improvement in the resulting cleaning.

Moreover, when the user leaves the vacuum cleaner in an inactive condition with the motor running, the suction force does not decrease. Accordingly, the fan of the vacuum cleaner continues to rotate at the rate set by the user. This is so also, for example, when the suction hose is not in contact with the surface of the floor to be cleaned. This results, therefore, in the drawbacks that energy consumption is needlessly high and the noise level is highly unpleasant.

SUMMARY OF THE INVENTION

In view of the foregoing background, it is therefore an object of the invention to provide an intelligent suction device capable of automatically adapting the suction force according to the conditions of the surface to be cleaned.

Another object of the present invention is to provide an intelligent suction device capable of automatically adapting the suction force according to the conditions of the surface to be cleaned, particularly for vacuum cleaners and the like, in which an expert system for the constant and automatic control of the working setting of the device is implemented.

Another object of the present invention is to provide an intelligent suction device, particularly for vacuum cleaners and the like, in which the energy consumption and the noise level are always optimized.

Another object of the present invention is to provide an intelligent suction device which can assume a standby condition automatically when it is not momentarily used by the user.

Another object of the present invention is to provide an intelligent suction device, particularly for vacuum cleaners and the like, in which the suction force is always closely correlated to the type of surface to be cleaned.

Another object of the present invention is to provide an intelligent suction device, particularly for vacuum cleaners and the like, which is highly reliable and relatively easy to provide at competitive costs.

These and other objects will become apparent hereinafter are achieved by an intelligent suction device particularly for vacuum cleaners and the like, characterized in that it comprises a fuzzy-logic controller suitable to control the motor of a fan, whose suction pressure is detected by at least one pressure sensor which feeds back its measurement, in a closed loop, to the controller.

BRIEF DESCRIPTION OF THE DRAWINGS

Further characteristics and advantages of the invention will become apparent from the description of an embodiment of the device according to the invention, illustrated only by way of non-limitative example in the accompanying drawings, wherein.

DETAILED DESCRIPTION OF THE PREFERRED EMBODIMENTS

With reference to the above figures, the device according to the present invention is provided as follows. In a vacuum cleaner, the suction force is determined by the difference in pressure between the internal part of the system (low-pressure part) and the external part (atmospheric-pressure part). Internal suction is produced by means of a fan or turbine which is driven by an electric motor.

Figure 1:
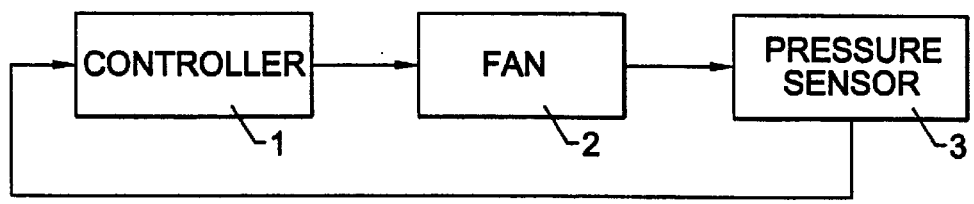
FIG. 1 is a block diagram of the control implemented in the device according to the present invention.

To control the working setting, it is thus fundamental to be able to measure the difference in pressure between the inside and the outside of the vacuum cleaner and to accordingly control the speed of the motor, so as to adjust the suction force. The device according to the invention thus includes a controller 1 connected to a fan 2 which is connected to a pressure sensor that feeds back the detected measurement to the controller 1. The type of control explained above is shown in FIG. 1.

The controller 1, on the basis of the pressure measurements obtained by the pressure sensor 3, decides the optimum speed to be applied to the motor of the fan 2 to obtain the best working setting. The controller 1 then implements an expert system capable of deciding, on the basis of differential pressure measurements, the optimum rotation rate of the fan 2.

This result can be obtained because suction depends highly on the type of floor being cleaned. In particular, suction should increase as the porosity of the floor increases. For an equal rotation rate of the fan 2, a carpet produces a higher suction. On the basis of this consideration, it is possible to increase or decrease the speed of the motor automatically as a function of the type of floor being cleaned.

By using the pressure measurement system, it is possible to determine whether the vacuum cleaner is being used or whether it has been left switched on but is not being used. In these conditions it is in fact very convenient to lower the motor speed to reduce the noise and the energy consumption of the vacuum cleaner.

This result can be achieved by using the controller 1 used above, implementing a second expert system which is capable of determining whether to put the device in standby mode or not by pressure variation measurements. For this second type of control it is important to measure pressure variations rather than the differential pressure. The pressure variation is in fact nil or very low when the system is not used, such as, for example, when the suction hose is in the air or left idle on the floor. By using the same approach, it is also possible to determine whether the suction duct is clogged. In this conditions, in fact, the air flow in the fan drops to almost zero and so do the corresponding pressure variations. The device is made to leave the standby mode when a pressure variation that can be ascribed to the reuse of the vacuum cleaner is detected.

All the expert systems implemented for controlling the fan of the vacuum cleaner may be provided with fuzzy systems implemented with a microcontroller of the WARP 3 family. Of course, microcontrollers of another kind may also be used.

The controller 1 thus implements two expert systems: the first system is used for the optimum control of the working setting of the vacuum cleaner, while the second system is used to place the system in standby when the vacuum cleaner is being used. In the first expert system, the input is the pressure and the output is the speed to which the motor must be brought.

Figure 2:
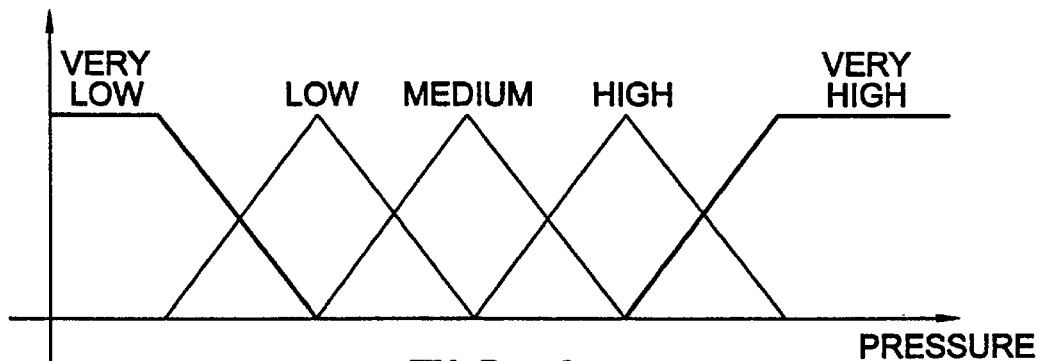
FIG. 2 is a chart plotting an example of fuzzy sets defined for a measurement input value.

FIG. 2 illustrates an example of fuzzy sets defined for the input pressure. The measured pressure value depends on the type of vacuum cleaner being used and, in particular, on the power of the electric motor. The power is usually within the range between 0 and 5 psi.

The output of the fuzzy system is the speed to be imparted to the fan 2. This value has been characterized by using singletons rather than membership functions.

Figure 3:
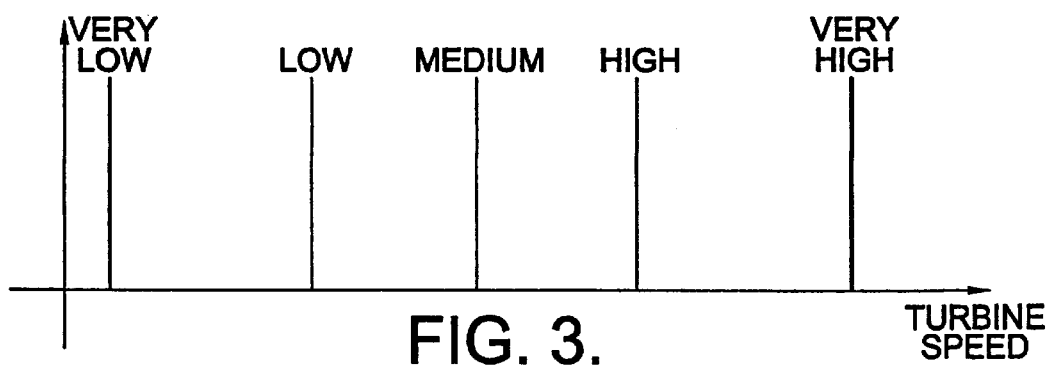
FIG. 3 is a chart plotting the characterization of the speed of the fan.
Figure 4:
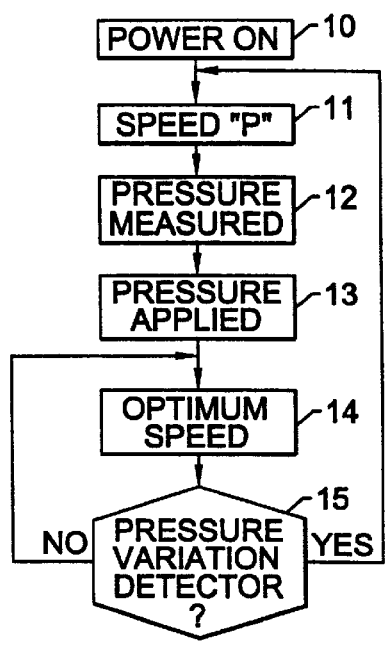
FIG. 4 is a flowchart of the algorithm for determining the type of floor to be cleaned.

FIG. 3 illustrates the characterization of the speed of the fan. FIGS. 2 and 3 describe the pressure and speed of the fan merely from a qualitative point of view. Quantitatively, the values associated with the fuzzy sets are set as a function of the vacuum cleaner being used (system geometries, motor power).

The rules used to implement the expert system are of the following kind:

IF pressure IS very low THEN speed IS high
 IF pressure IS low THEN speed IS high
 . . . . . . .
 . . . . . . .
 . . . . . . .
 IF pressure IS high THEN speed IS low, The above expert system thus allows determining the type of floor being cleaned. The implemented algorithm is provided as follows.

At power-on, step 10, the device is brought to a fixed speed, referenced to as speed "p" in step 11. During the subsequent step 12, the pressure is measured and used in step 13 by the fuzzy expert system to obtain, step 14, a speed which is equal to the optimum speed the device must assume.

The speed set by the fuzzy expert system is maintained until intense pressure variations are detected. If at step 15, intense pressure variations are detected, the algorithm goes from step 15 back to step 11, otherwise it returns to step 14 to maintain the speed at the determined optimum value.

These steps are performed to avoid problems in determining the type of floor. Characterization of the system is performed in a laboratory by using a specific rotation rate of the motor (speed="p"). Together with this speed, pressure values related to different types of floor (parquet, marble, fitted carpet, etc.) are detected. For this reason it is necessary, during the step for determining the optimum working setting, to bring the system to the reference speed (speed="p"). This is so since classification of the type of floor is valid only if the measurement conditions are the same as those used during the system characterization step.

The second fuzzy expert system implemented in the controller 1 uses the pressure variation measurements to determine the standby mode. In the standby mode the speed of the motor of the vacuum cleaner is reduced. In this case, the fuzzy system operates in an optimum manner when information related to the first derivative and to the second derivative of the pressure are used as inputs.

Figure 5:
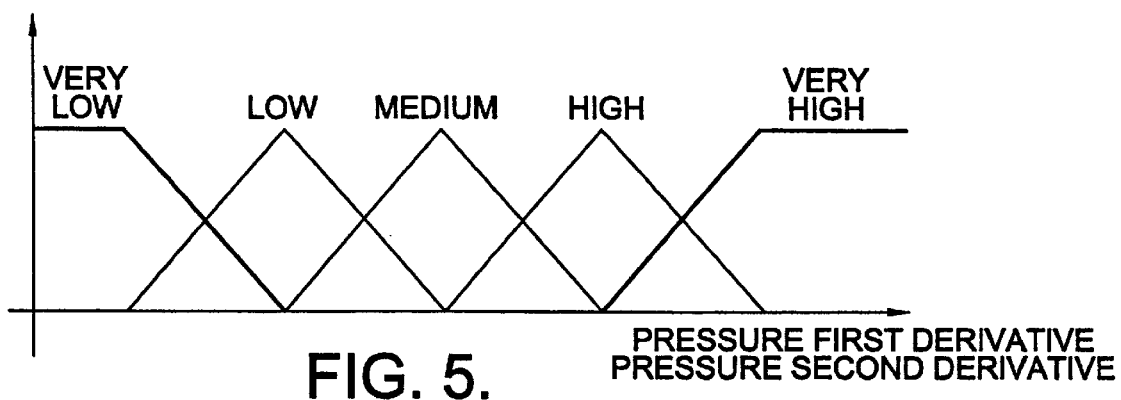
FIG. 5 is a chart plotting the fuzzy sets of two input variables, i.e., the first derivative of the pressure and the second derivative of the pressure.
Figure 6:
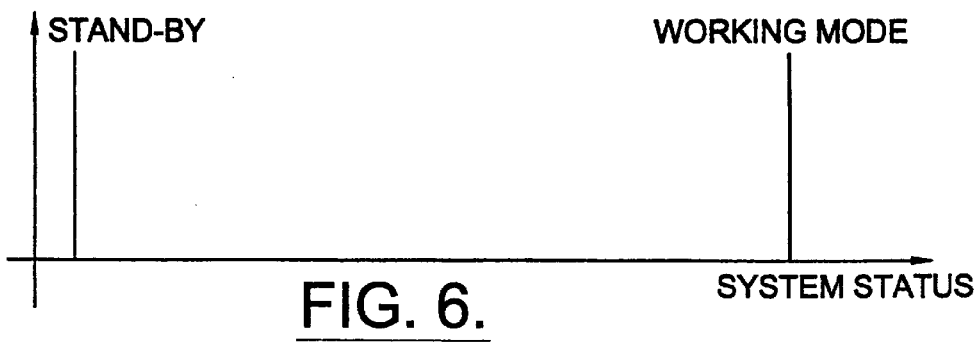
FIG. 6 is a chart of the state of the system.

The fuzzy sets related to said two input variables are of the type shown in FIG. 5. The output variable allows determining whether the system must continue to work or must be placed in the standby mode. In the first case, the optimum speed determined by the first expert system is maintained. In the second case, the speed of the system is instead reduced to a minimum value.

The motor cannot be switched off, since to bring the system out of standby mode it is necessary to detect a pressure variation. This is possible only if a minimum flow of air is present.

The rules used by this second fuzzy expert system implemented in the controller 1 are of the following type:

IF first derivative of pressure IS VERY LOW AND second derivative of pressure IS VERY LOW THEN system state IS standby;

IF first derivative of pressure IS VERY LOW AND second derivative of pressure IS LOW THEN system state IS standby;

. . . . . . .
. . . . . . .

IF first derivative of pressure IS LOW AND second derivative of pressure IS VERY LOW THEN system state IS standby; and IF first derivative of pressure IS HIGH AND second derivative of pressure IS VERY HIGH THEN system state IS working mode.

To avoid oscillation in determining the state of the system, time-based hystereses are provided which allow the system to enter the standby condition only if the condition persists for a time T which is set during design.

Figure 7:
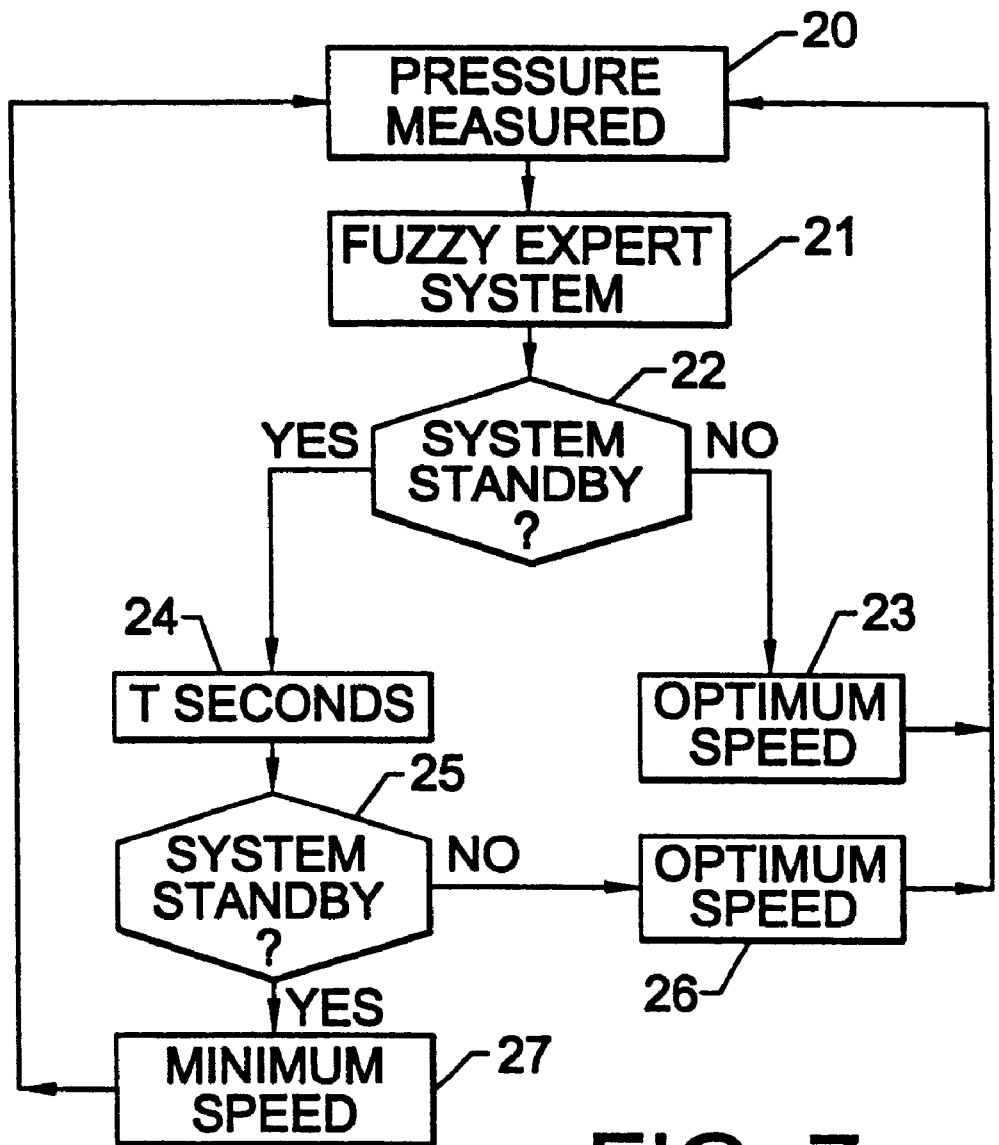
FIG. 7 is a flowchart of an algorithm for determining the standby mode of the device according to the present invention.

The algorithm that determines the behavior of the device in standby conditions is shown in FIG. 7. Step 20 measures the first and second derivatives of the pressure detected by tie pressure sensor 3 and then sends the measurements to the fuzzy expert system, designated by the reference numeral 21. In this case, the expert system checks, during the step 22, whether the system is in standby or not.

In case of a negative response, the speed of the fan of the motor is set to the optimum value, step 23. The algorithm then returns to the step 20 for measuring the derivatives of the pressure.

In case of a positive response, a step 24 is instead performed during which the algorithm waits for T seconds. At this point, the algorithm is executed in step 25, which is similar to step 22 and in which the standby mode of the system is checked. In this case too, if the response is negative, the algorithm moves on to a step 26, similar to step 23, and returns to step 20 from there. In case of positive response, instead, a step 27 is performed during which the speed of the fan is set equal to a minimum value and the algorithm then returns to step 20.

The above-described intelligent device can be split into four subsystems:

1) a computing subsystem for implementing the expert systems;
2) a subsystem for conditioning the signal arriving from the suction sensor. The subsystem must provide information regarding the absolute value of the suction and its derivatives. As an alternative, the value of the derivatives can be computed by the microcontroller used to implement the expert systems;
3) a subsystem for controlling the speed of the fan motor. The subsystem is determined by the type of electric motor used to control the speed of the fan 3.

If the motor is a universal motor, control can be performed by a triac, by changing the effective value of the AC voltage applied to the motor. In this case, the level of the optimum speed set by the two expert systems produces a delay in the switching on of the triac (phase slicing control); and 4) a power supply subsystem.

Implementation of the expert systems requires the use of a microcontroller which, based on the information arriving from the pressure sensor 4, which is of the differential type, is able to determine the optimum working setting. As mentioned, it is possible to use, for example, the microcontroller of the WARP 3 family.

In practice, it has been observed that the device according to the invention fully achieves the intended aim and objects of the invention, since it allows automatically control of the suction force of a vacuum cleaner. Accordingly, the invention achieves optimization of the working setting and a consequent reduction in noise and energy consumption. This control is provided according to the conditions of the surface being cleaned. Without increasing the complexity and therefore the cost of the device, it is also possible to detect conditions or the non-use of the vacuum cleaner and place the system in standby until later reuse.

The device thus conceived is susceptible of numerous modifications and variations, all of which are within the scope of the inventive concept. All of the details may also be replaced with other technically equivalent elements.

That which is claimed is:

1. A method for controlling a suction force of a suction device comprising a motor driven fan, the method comprising:

measuring a pressure difference between an internal pressure within the suction device and an external pressure external to the suction device; and controlling a speed of the motor based upon at least one derivative of the measured pressure difference.

2. A method according to claim 1, wherein controlling comprises the steps of:

bringing the motor to a fixed speed;

using a pressure value measured by a pressure sensor using a first fuzzy-logic expert system; and maintaining a speed determined by the fuzzy-logic expert system until pressure variations are detected.

3. A method according to claim 1, further comprising determining a condition of the suction device between one of a working condition and a standby condition.

4. A method according to claim 3, wherein determining a condition comprises the steps of:

determining a first derivative and a second derivative of the at least one derivative of pressure detected by the pressure sensor;

using a second fuzzy-logic expert system to determine the condition of the device based on the first and second derivatives; and if the device is determined to be in the standby condition, then waiting for a preset time before confirming the standby condition and setting a speed of the motor to a minimum value.

5. A method for controlling a suction force of a suction device comprising a motor driven fan, the method comprising:

bringing the motor to a fixed speed;

sensing pressure generated by the suction force;

determining at least one derivative of the sensed pressure; and controlling a speed of the motor using a first fuzzy-logic expert system responsive to the at least one derivative.

6. A method according to claim 5, wherein controlling comprises the step of maintaining a speed determined by the first fuzzy-logic expert system until pressure variations are detected.

7. A method according to claim 5, further comprising determining a condition of the suction device between one of a working condition and a standby condition.

8. A method according to claim 7, wherein the step of determining a condition comprises:

determining a first derivative and a second derivative of the least one derivative of pressure detected by the pressure sensor;

using a second fuzzy-logic expert system to determine the condition of the device based on the first and second derivatives; and if the device is determined to be in the standby condition, then waiting for a preset time before confirming the standby condition and setting a speed of the motor to a minimum value.

9. A method for controlling a suction force of a suction device comprising a motor driven fan, the method comprising:

measuring a pressure difference between an internal pressure within the suction device and an external pressure external to the suction device; and controlling a speed of the motor to one of a standby condition and a working condition based upon at least one derivative of the measured pressure difference.

10. A method according to claim 9, wherein the step of controlling comprises:

determining a first derivative and a second derivative of the at least one derivative of pressure detected by the pressure sensor;

using a fuzzy-logic expert system to determine the condition of the device based on the first and second derivatives; and if the device is determined to be in the standby condition, then waiting for a preset time before confirming the standby condition and setting the speed of the motor to a minimum value.

* * * * *